United States Patent [19]

Grealy et al.

[11] 4,391,750

[45] Jul. 5, 1983

[54] HEAT GELLABLE PROTEIN ISOLATE

[75] Inventors: Jennifer M. Grealy, Gores Landing; Terrence J. Maurice, Colborne, both of Canada

[73] Assignee: General Foods Inc., Toronto, Canada

[21] Appl. No.: 452,035

[22] Filed: Dec. 22, 1982

[51] Int. Cl.$^3$ .............................. A23J 1/12; A23J 1/14

[52] U.S. Cl. .............................. 260/123.5; 260/112 R; 260/112 G; 426/656

[58] Field of Search ............ 260/112 R, 123.5, 112 G; 426/656

[56] References Cited

U.S. PATENT DOCUMENTS

| | | | |
|---|---|---|---|
| 3,870,801 | 3/1975 | Tombs | 260/112 R |
| 4,169,090 | 9/1979 | Murray et al. | 260/123.5 |
| 4,172,828 | 10/1979 | Davidson et al. | 260/123.5 |
| 4,208,323 | 6/1980 | Murray | 260/123.5 |
| 4,234,620 | 11/1980 | Howard et al. | 260/123.5 X |
| 4,247,573 | 1/1981 | Murray et al. | 260/123.5 X |
| 4,285,862 | 8/1981 | Murray et al. | 260/123.5 |
| 4,307,014 | 12/1981 | Milnar | 260/123.5 |
| 4,328,252 | 5/1982 | Murray et al. | 260/123.5 X |

*Primary Examiner*—Howard E. Schain
*Attorney, Agent, or Firm*—Sim & McBurney

[57] ABSTRACT

Starch is used to enhance the gel hardness of heat set protein gels. The protein gels are formed from dispersions of a protein micellar mass manipulated with respect to pH and ionic strength to a pH up to about 6.0 and an ionic strength of greater than 0.2 M.

27 Claims, No Drawings

HEAT GELLABLE PROTEIN ISOLATE

FIELD OF INVENTION

The present invention relates to novel heat gellable protein isolates which are suitable for use as substitutes or extenders for egg white.

BACKGROUND OF THE INVENTION

In our copending United States patent application Ser. No. 348,875 filed Feb. 16, 1982, the disclosure of which is incorporated herein by reference, there are described heat set gels having hardness values which are at least those of heat set gels formed from dispersions of egg white in water having the same dispersion concentration.

Such heat set gels are formed from dispersions of certain undenatured vegetable protein isolates containing at least about 90% by weight of vegetable protein (as determined by Kjeldahl nitrogen×6.25), known as protein micellar mass, or PMM. The protein dispersions are manipulated as to pH and ionic strength values, so as to provide dispersions having an ionic strength of at least about 0.2 molar and a pH of up to about 6.0.

Heat set gels produced from 20% w/w egg white dispersions typically have hardness values of about 35 to 40 texturometer units (T.U.), as determined by the G.F. Texturometer. The G.F. Texturometer and its operation are described in detail in an article entitled "The Texturometer—A New Instrument for Objective Texture Measurement" by H. H. Friedman et al. published in J. of Food Science, vol. 28, p. 130 (1963).

SUMMARY OF INVENTION

It has now surprisingly been found that the substitution of small amounts of gellable starch for the protein micellar mass in the dispersions from which the heat set gels are formed leads to an increase in the gel hardness of the gel which is formed upon heat setting the dispersion, at the same dispersion concentration.

The substitution of increasing amounts of starch for protein micellar mass results in increasing values of gel hardness until a maximum gel hardness value is achieved, beyond which further increasing amounts of starch result in decreasing values of gel hardness. Substitution for up to about 30% of the protein micellar mass by starch in the dispersion may be effected without significantly adversely affecting the gel hardness value which may be attained upon gelation of the dispersion.

The surprising synergistic result of the mixture of protein micellar mass and starch enables gels of egg white hardness to be achieved using lower concentrations of protein isolate. A cheap raw material is used to replace the more costly protein micellar mass, thereby realizing a cost saving while at the same time providing a material which may be used as an egg white replacement or extender in food systems which employ egg white to provide gelation.

GENERAL DESCRIPTION OF INVENTION AND DESCRIPTION OF PREFERRED EMBODIMENTS

The present invention is based on the synergistic effect of starch and a protein micellar mass, in combination with manipulation of pH and ionic strength.

In U.S. Pat. Nos. 4,169,090, 4,208,323, 4,296,026 and 4,307,014, assigned to the assignee of this application, the disclosures of which are incorporated herein by reference, there are described procedures for isolating protein from protein source materials by solubilizing the protein by contact of the protein source material with sodium chloride solution under critical pH and ionic strength conditions and diluting the protein solution with water to a lower ionic strength to cause the formation of protein micelles in the aqueous phase which settle and are collected as an amorphous protein micellar mass. The protein solution may be subjected to ultrafiltration prior to the dilution step and the settling may be enhanced by centrifugation.

The protein micellar mass produced by this procedure is a novel protein isolate and represents the vegetable protein isolate with which the starch is mixed to form the heat gellable dispersions herein. The novel protein isolate is described in detail in U.S. Pat. No. 4,285,862, assigned to the assignee of this application, the disclosure of which is incorporated herein by reference.

As described in more detail therein, the novel protein isolate is a substantially undenatured protein isolate product containing at least about 90% by weight of vegetable protein, (as determined by Kjeldahl nitrogen×6.25) and in the form of a protein micellar mass which is formed by settling an aqueous dispersion of protein micelles consisting of homogeneous amphiphilic protein moieties and formed from at least one vegetable protein source material, thereby collecting an amorphous protein mass. The protein isolate product has substantially no lipid content, substantially no lysinoalanine content and substantially the same lysine content as the storage protein in the source material. The isolate product may be provided in dry form by drying the amorphous protein mass.

The aqueous dispersion of protein micelles from which the isolate is settled may be formed, in accordance with the procedure of U.S. Pat. No. 4,169,090, by solubilizing the protein in the vegetable protein source material at a temperature of about 15° to 35° C. using a food grade salt solution having a concentration of at least 0.2 molar ionic strength and a pH of 5.5 to 6.3 to form a protein solution, and diluting the protein solution to an ionic strength of less than 0.1 molar to cause formation of the dispersion.

The aqueous dispersion of protein micelles also may be formed, in accordance with the procedure of U.S. Pat. No. 4,208,323, by solubilizing the protein in the vegetable protein source material at a temperature of about 15° to about 35° C. using a food grade salt solution having a concentration of at least 0.2 molar ionic strength and a pH of about 5 to about 6.8 to form a protein solution, increasing the protein concentration of the protein solution while maintaining the ionic strength thereof substantially constant, and diluting the concentrated protein solution to an ionic strength below about 0.2 molar to cause formation of the dispersion.

In the latter process, the food grade salt solution preferably has an ionic strength of about 0.2 to about 0.8 molar and a pH of about 5.3 to about 6.2. In addition, the protein concentration step is preferably effected by a membrane technique at a volume reduction factor about 1.1 to about 6.0, as determined by the ratio of volume of protein solution and the volume of concentrated protein solution.

Further, the dilution of the concentrated protein solution is preferably effected by passing the concentrated protein solution into a body of water having a temperature below about 25° C. and a volume sufficient to decrease the ionic strength of the concentrated protein solution to a value of about 0.06 to about 0.12 molar.

In one embodiment of the latter process, the food grade salt solution has a pH of about 5 to about 5.5 and the phosphorous content of the protein solution is decreased prior to the dilution step.

The food grade salt used in the above-described solubilization procedures usually is sodium chloride, although other salts, such as, potassium chloride or calcium chloride may be used.

As is set forth in U.S. Pat. No. 4,296,026, the purity of isolate which is obtained from soybeans may be improved by the presence of millimolar amounts of calcium chloride in the aqueous sodium chloride solution. As described therein, the protein is solubilized by contact with an aqueous sodium chloride solution having an ionic strength of at least about 0.2 molar and containing about 0.001 to about 0.01 M calcium chloride and having a temperature of about 15° to about 75° C.

Further, as is set forth in U.S. Pat. No. 4,307,014, the yield of isolate which is obtained from soybeans may be improved by effecting the protein solubilization at a temperature of about 15° to about 75° C. using an aqueous food grade salt solution of ionic strength of at least 0.2 M and a pH of about 5.6 to about 7.0, preferably about 6.0 to about 6.4, and then adjusting the pH of the protein solution to a pH of about 4.8 to about 5.4, preferably about 5.1 to about 5.3, prior to dilution of the pH-adjusted protein solution.

As is set forth in our prior application Ser. No. 348,875, referred to above, the heat gelation properties of dispersions of the protein isolate in water are improved by incorporating in such dispersions sufficient at least one food grade salt to provide an ionic strength of the dispersion of at least about 0.2 molar and sufficient at least one food grade acidifying agent to provide a pH of the dispersion of less than about 6.0. That procedure, in effect, is a post-manipulation of the product of U.S. Pat. No. 4,285,862, formed by the processes of U.S. Pat. Nos. 4,169,090 and 4,208,323, as improved upon for soybeans in accordance with the processes of U.S. Pat. Nos. 4,296,026 and 4,307,014, by the simultaneous actions of food grade salt and food grade acid to impart heat gelation properties to the isolate which are comparable to or exceed those of egg white, which properties are not possessed by the isolate itself.

In accordance with the present invention, a proportion of the protein isolate in the dispersion is replaced by a gellable starch. The replacement of the protein isolate preferably is effected using sufficient starch to produce an enhanced gel hardness upon gelation of the dispersion. Usually, about 1 to about 20% by weight, preferably about 5 to about 15% by weight, of starch of the total weight of protein isolate and starch.

The proportion of starch generally does not exceed about 30% by weight of the total weight of protein isolate and starch. At such concentrations, the hardness values of the gels are not significantly different from those of gels produced from the protein isolate above and, beyond such concentration, the gel hardness values decline rapidly.

The comparisons of gel hardness which are made herein are all made with respect to gels produced from dispersions having the same dispersion concentration. Usually, 20% w/w dispersions are used in such comparisons.

Even though the presence of as much as 30 wt% starch does not result in any advantage from the viewpoint of gel properties, nevertheless the decreased proportion of the more costly protein isolate achieved thereby results in the obtaining, at a lower cost, of desired gel hardness properties, preferably at least those of heat set gels produced from dispersions of egg white in water at the same dispersion concentration.

Further, at lower starch concentrations, the enhanced gel hardness in comparison to egg white, is achieved at a lower overall protein concentration than is the case with egg white. Hence, to obtain the same gel hardness as is achieved with egg white, a lower dispersion concentration, and hence even lesser concentration of vegetable protein isolate, may be used, with consequential economy of use of protein isolate.

The starch and vegetable protein isolate may be provided in the dispersion in any convenient manner. For example, the vegetable protein isolate and starch may be separately dispersed in the aqueous phase. Alternatively, the starch may be mixed with wet or dry PMM and the resulting mixture dispersed in the aqueous phase.

As noted above, the pH and ionic strength of the dispersion is manipulated to achieve a dispersion having improved gelation properties. pH manipulation is achieved using at least one food grade acidifying agent while ionic strength manipulation is achieved using at least one food grade salt. Where the starch is separately added to the dispersion, such addition may be effected before or after such pH and ionic strength manipulation.

The ionic strength of the dispersion provided by the added at least one food grade salt usually varies from the lower limit of about 0.2 molar up to about 1.5 molar and preferably is in the range of about 0.3 to about 0.75 molar for the reasons discussed in detail below. While such ionic strength values represent a relatively high salt concentration in terms of the heat gellable dispersion, the overall salt concentration in a food composition incorporating the heat gellable dispersion will inevitably be very much lower and invariably within tolerable levels.

The pH of the dispersions provided by the addition of food grade acidifying agents may vary from the upper limit of about 6.0 down to about 3.5 and preferably is in the range of about 4.5 to about 5.5 for the reasons discussed in detail below.

The incorporation of the food grade salt and food grade acidifying agent into the protein dispersion may be effected in a number of ways. One manner of incorporation is to dissolve the food grade salt and food grade acidifying agent directly in an aqueous dispersion of the vegetable protein isolate which may also contain the starch.

Alternatively, the food grade salt and food grade acidifying agent, in the required proportions, may be uniformly mixed with the settled protein mass from the isolation procedure after separation from the residual aqueous phase along with the starch, the mixture thereupon dried and the dispersion formed from the dried mixture. Such a dried mixture also may be formed by dry mixing the food grade salt, food grade acidifying agent, dried isolate and starch.

The relative proportion of protein, starch, food grade salt and food grade acidifying agent in such intermixed dry compositions depends on a number of factors, including the intended protein concentration in the aqueous heat gellable dispersion to be formed therefrom, the proportion of the protein to be replaced by the starch, the form of the acidifying agent and the source of the food grade salt.

For example, the food grade acidifying agent may be such as to provide part of the food grade salt. Also, the overall food grade salt concentration may be intended to be provided in part by the food system with which the protein dispersion is to be used.

In general, for each 100 parts by weight of mixture of dry vegetable protein isolate and starch, there may be mixed therewith about 0.5 to about 4.0 parts by weight of food grade acidifying agent and up to about 2.5 parts by weight of food grade salt. Such a composition is capable of dispersing in water to form a dispersion of protein concentration of about 10 to about 30% w/w wherein the isolate and starch are dispersed in an aqueous phase having an ionic strength of at least about 0.2 molar and a pH of up to about 6.0.

The food grade salt used in this invention to provide the required ionic strength usually is sodium chloride, although other food grade salts, such as, potassium chloride or calcium chloride may be used.

The food grade acidifying agent used in this invention to provide the required pH value may be any desired food grade acid, usually hydrochloric acid, but also including phosphoric acid, citric acid, malic acid and tartaric acid. The food grade acidifying agent may be of such a nature that it provides part of the ionic strength in the dispersion, for example, sodium tartrate or sodium citrate.

It has been found that an increase in the ionic strength of the dispersion above about 0.2 molar leads to an increased hardness of heat set gel formed from the dispersion up to a maximum at a given pH up to about 6.0, before once again decreasing.

Further, as the pH is decreased, an increased gel hardness is observed for the same ionic strength value above about 0.2 molar to a peak beyond which further decreases in pH value lead to decreases in gel strength. As the ionic strength of the dispersion increases, the peak gel hardness occurs at a lower pH value.

There is a broad spectrum of ionic strength and pH values over which the gel strength does not significantly change and the gel strength value usually is at least about 35 T.U. and preferably at least about 40 T.U. and hence at least as good as egg white gels (35 to 40 T.U.) produced from the same 20% w/w dispersions thereof.

For example, for soy PMM gels with no added sodium chloride in the pH range of 4.5 to 7.5, the gels were generally soft, exhibiting hardness values of 4 to 8 T.U. with the hardest gel (21 T.U.) being produced at pH 6.5 (from 20% w/w dispersions thereof). These values compare with hardness values for egg white gels (35 to 40 T.U.) formed at the same dispersion concentration.

As the concentration of added sodium chloride increased, the magnitude of the gel hardness values obtained increased, reaching a maximum value (from a 20% w/w dispersion) in excess of egg white of 40 T.U. at pH 5.0 and 0.5 M NaCl, with the maximum value increasing significantly to above 50 T.U. at 10 to 20% substitution of starch for isolate. Increased concentrations of sodium chloride in the range of 0.75 to 1.0 M over the pH range caused a slight decrease in gel hardness from this maximum. A broad region of high gel hardness was observed at sodium chloride levels above 0.3 M and gels with hardness values above 40 T.U. from 20% w/w dispersions thereof were obtained in the pH range of 4.5 to 5.5. With increasing sodium chloride concentration, the pH at which maximum gel hardness occurs decreased from pH 6.5 at 0 M NaCl to pH 5.0 at 0.5 M NaCl and pH 4.5 at 1.0 M NaCl.

The presence of the added salt substantially increases the dispersibility of the proteins. At low ionic strength values, from 0 to 0.1 M, dispersibility is low, ranging from 10 to 30% and gels produced under these conditions are extremely soft. At 0.2 M NaCl and above, dispersibility increases markedly to greater than 70% and is relatively insensitive to NaCl concentration and changes in pH. The gel hardness of the heat set gels, however, is independent of the dispersibility above about 30% and both hard and soft gels may be attained under conditions where the protein dispersibility exceeds 70%.

The manipulation of the dispersions formed from the protein isolate and starch by the addition of sodium chloride and pH adjustment enables heat-set gels to be formed which have hardness values which are as good as or exceed those of egg white produced at the same dispersion concentration. This result enables the dispersions or dry mixes of the isolate, starch, food grade salt and food grade acidifying agent to be used in various food systems more efficiently than the unmodified isolate as a substitute or extender for egg white, where the egg white is used for its gelation properties.

The food system in which the compositions of this invention find particular utility include various meat analogs, including bacon analogs, such as that described in U.S. Pat. No. 3,840,677, assigned to General Foods Corporation. The broad spectrum of pH and salt concentration values over which the high gel hardness values are attained permits flexibility from a processing standpoint. The presence of the starch enables the amount of protein isolate which is required to be decreased.

Egg white is multifunctional over a wide range of conditions and often is used in meat analogs for both gelation and emulsification properties. The PMM isolate, however, exhibits functionality which is much more sensitive to environmental conditions, so that the conditions which favour optimum gelation properties, as set forth herein, may not necessarily be those conditions which favour emulsification, so that the composition of this invention often cannot be substituted directly into a formulation which has been optimized for egg white multifunctionality.

The protein source material from which the protein isolate is formed may be any convenient salt-extractable vegetable protein source, usually an oil seed, preferably soybeans, or a legume, preferably fababeans and field peas. The responses of the isolates from differing protein sources are similar and any differences in gelation behaviour result from differences in specific characteristics, such as, amino acid composition, between the protein sources.

The starch material which is used may be any convenient gellable starch material, including cornstarch, tapioca and peas. Starch is a cheap, readily available material and the ability to utilize the same in synergistic admixtures with PMM enables there to be produced gels which compare with or exceed hardness values of egg white gels while using decreased quantities of vegetable protein isolate.

EXAMPLES

EXAMPLE 1

This Example illustrates the effect of starch on the gel hardness of gels produced from dispersions of soy PMM.

A protein isolate was formed from soybeans following the procedure of U.S. Pat. No. 4,208,323. Soybean concentrate (about 50 wt% protein) was mixed with 50 Imperial gallons of 0.35 molar sodium chloride solution at a 15% w/v concentration at a temperature of about 25° C. The mixture was stirred for about 30 minutes at a pH of about 5.8. The aqueous protein extract was separated from residual solid matter.

The extract was concentrated on an ultrafiltration unit using a "ROMICON" (Trademark) type XM50 and a Romicon type PM50 cartridge for a time sufficient to achieve a volume reduction factor of four times. The Romicon ultrafiltration cartridges are manufactured by Rohm and Haas Company, the designation "50" referring to a molecular weight cut-off of 50,000 Daltons.

The concentrate was diluted into cold water having a temperature of 7° C. to an ionic strength of 0.1 molar whereupon a white cloud of protein isolate formed in the dilution system. The protein dispersion was allowed to settle as a highly viscous amorphous gelatinous precipitate (wet PMM) in the bottom of the dilution vessel. The wet PMM was separated from the residual aqueous phase.

Samples of the dry isolate were mixed with varying amounts of cornstarch and were formed into 20% w/w aqueous dispersions. The ionic strength of such dispersions was adjusted to 0.5 M using sodium chloride and the pH of the dispersions also was adjusted to varying values by the addition of hydrochloric acid. Samples were dispersed for 30 minutes at ambient temperature (20° to 25° C.).

The protein dispersions were poured into stainless steel gel tubes (2½ in × 3¼ in I.D.) with removable stainless steel caps after greasing to facilitate removal of the gel. The gel tubes were heated in a boiling water bath for 45 minutes and then cooled to 20° C. for a minimum of 20 minutes. The gels were removed from the tubes immediately before testing, to minimize water loss from the surface.

Each gel was sliced into ¾ inch length cylinders and tested for hardness on the G.F. Texturometer using a 2 inch diameter disc plunger. Each sample was compressed twice and the peak heights measured. The hardness was calculated according to the method of Friedman et al. (mentioned above) from the formula:

$$\text{Hardness } (T.U.) = \frac{\text{Height of first peak} \times \frac{\text{millivolts}}{2}}{\text{voltage}}$$

The hardness values obtained for the various gels are reproduced in the following Table I:

TABLE I

| Components | | Gel Hardness (T.U.) | | |
|---|---|---|---|---|
| Soy PMM (g) | Cornstarch (g) | pH 5 | 5.5 | 6.0 |
| 10 | 0 | 41 | 30 | 35 |
| 9 | 1 | 59 | 38 | 43 |
| 8 | 2 | 52 | 35 | 35 |
| 7 | 3 |  | 31 | 32 |
| 6 | 4 |  | 21 | 28 |

TABLE I-continued

| Components | | Gel Hardness (T.U.) | | |
|---|---|---|---|---|
| Soy PMM (g) | Cornstarch (g) | pH 5 | 5.5 | 6.0 |
| 0 | 10 |  | 12 | 12 |

As may be seen from the results of Table I, significantly increased gel hardness was attained at a 10 wt% replacement of starch for protein, while at a 30 wt% replacement of starch for protein there was no significant decrease in gel hardness.

EXAMPLE 2

This Example illustrates the effect of starch on the gel hardness of gels produced from egg white dispersions.

The gel hardness determination procedure of Example 1 was repeated with egg white replacing the soy PMM in the 20% w/w dispersions. The pH was adjusted to 6.0 and the salt concentration to 0.5 M NaCl. The results obtained are reproduced in the following Table II:

TABLE II

| Components | | Gel Hardness |
|---|---|---|
| Egg White (g) | Cornstarch (g) | (T.U.) |
| 10 | 0 | 45 |
| 9 | 1 | 48 |
| 8 | 2 | 50 |
| 7 | 3 | 45 |
| 0 | 10 | 12 |

The results of the above Table II demonstrate the same effect is attained with egg white as is attained with soy PMM.

EXAMPLE 3

This Example illustrates the effect of starch on gel hardness of gels produced from other PMM dispersions.

PMM from fababeans was formed following the procedure outlined in Example 1 and gel hardness was determined following the procedure of Example 1 at 0.3 M sodium chloride and pH 6.0. The results obtained are set forth in the following Table III:

TABLE III

| Components | | Gel Hardness |
|---|---|---|
| Fababean PMM (g) | Cornstarch (g) | (T.U.) |
| 20 | 0 | 29 |
| 19 | 1 | 32 |
| 18 | 2 | 32 |
| 17 | 3 | 29 |
| 16 | 4 | 25 |

As may be seen from the results of Table III, fababean PMM exhibits similar behaviour when low concentrations of starch are used to replace protein, but the effects are not as pronounced as those observed for soy PMM.

EXAMPLE 4

This Example illustrates the effect of added starch on protein gelation.

The gel hardness determination procedure of Example 1 was repeated for gels produced from dispersions formed from increasing amounts of cornstarch added to 10 g samples of various protein materials and adjusted to pH 5.5 and ionic strength 0.5 M sodium chloride. The results obtained are reproduced in the following Table IV:

TABLE IV

| Amount of Cornstarch (g) | Hardness Values (T.U.) | | |
|---|---|---|---|
| | Soy PMM | Faba PMM | Egg White* |
| 0 | 30 | 29 | 40 |
| 1 | 37 | 31 | — |
| 2 | 39 | 35 | 42 |
| 4 | 47 | — | 51 |
| 6 | 43 | 34 | 57 |

*Determined for gels at pH 6.0, 0.3 M NaCl

The results of Table IV show that the addition of starch to constant concentrations of protein isolates increases gel hardness values significantly.

EXAMPLE 5

This Example illustrates the use of differing types of starch in the formation of gels.

The gel hardness determination procedure of Example 1 was repeated using differing starch materials in dispersions adjusted to pH 5.5 and 0.5 M NaCl. The results obtained are reproduced in the following Table V:

TABLE V

| Components | | Starch Type | | | |
|---|---|---|---|---|---|
| Soy PMM (g) | Starch (g) | Amioca[1] | Hylon[2] | Baka Snak[3] | Tapioca |
| | | Hardness Values (T.U.) | | | |
| 20 | 0 | 30 | 30 | 30 | 30 |
| 19 | 1 | 32 | 35 | 33 | 33 |
| 18 | 2 | 30 | 32 | 31 | 37 |
| 17 | 3 | 26 | 34 | 18 | 30 |
| 16 | 4 | 28 | 28 | 8 | 27 |

Notes:
[1] A waxy maize starch containing no amylose
[2] A high amylose cornstarch (55% amylose)
[3] A pregelatinized waxy maize starch.
[4] AMIOCA, HYLON and BAKA SNAK are trademarks of National Starch Company.

As may be seen from the results of the above Table, the effects of Hylon are comparable to those seen with cornstarch and tapioca starch also improves the gelation when used at low levels. Baka Snak showed some improvements in gel hardness at low concentrations but gel hardness values fell rapidly at replacement concentrations of 15% and higher.

SUMMARY OF DISCLOSURE

In summary of this disclosure, the present invention provides gels of improved hardness by utilizing starch in combination with protein isolates. Modifications are possible within the scope of the invention.

What we claim is:

1. An aqueous protein dispersion suitable for heat gelation to a gel, which comprises a composition dispersed in an aqueous phase having an ionic strength of about 0.3 to about 0.75 molar and a pH of about 4.5 to about 5.5, said composition comprising at least 70% by weight of a substantially undenatured vegetable protein isolate and up to about 30% by weight of a starch, said vegetable protein isolate being one formed by settling an aqueous dispersion of protein micelles consisting of homogenous amphiphilic protein moieties.

2. The dispersion of claim 1 wherein said starch comprises about 1 to about 20% by weight of the composition.

3. The dispersion of claim 2 wherein said starch comprises about 5 to about 15% by weight of the composition.

4. The dispersion of claim 1 wherein said composition is present in said dispersion in a concentration of about 10 to about 30% w/w.

5. The dispersion of claim 4 wherein said food grade salt is sodium chloride and said food grade acid is hydrochloric acid.

6. The dispersion of claim 1 wherein said starch comprises about 1 to about 20% by weight of the composition and the composition is present in the dispersion in a concentration of about 10 to about 30% w/w.

7. The dispersion of claim 6 wherein said starch comprises about 5 to about 15% by weight of the composition.

8. A method of improving the heat gelation properties of a substantially undenatured vegetable protein isolate containing at least about 90% by weight of vegetable protein (as determined by Kjeldahl nitrogen $\times 6.25$), which comprises:
  (a) settling an aqueous dispersion of protein micelles consisting of amphiphilic protein moieties and formed from at least one vegetable protein source material to provide an amorphous protein mass containing said substantially undenatured protein isolate, said isolate having substantially no lipid content, substantially no lysinoalanine content and substantially the same lysine content as the storage protein in the source material,
  (b) mixing said vegetable protein isolate with a starch to form a composition comprising up to about 30% by weight of said starch, and
  (c) subsequently treating said composition both with at least one food grade salt and at least one food grade acidifying agent to incorporate in a heat gellable dispersion of said composition sufficient food grade salt to provide an ionic strength of said dispersion of at least about 0.2 and sufficient food grade acidifying agent to provide a pH of said dispersion of up to about 6.0.

9. The method of claim 8 wherein said ionic strength is from about 0.2 to about 1.5 molar.

10. The method of claim 9 wherein said ionic strength is from about 0.3 to about 0.75 molar.

11. The method of claim 8 wherein said food grade salt is sodium chloride.

12. The method of claim 8 wherein said pH value is from about 3.5 to about 6.0.

13. The method of claim 12 wherein said pH value is from about 4.5 to about 5.5.

14. The method of claim 8 wherein said food grade acidifying agent is selected from the group consisting of hydrochloric acid, phosphoric acid, citric acid, malic acid or tartaric acid.

15. The method of claim 8, wherein said ionic strength is from about 0.3 to about 0.75 molar, said pH value is from about 4.5 to about 5.5, said food grade salt is sodium chloride and said food grade acid is hydrochloric acid.

16. The method of claim 15 wherein said starch is present in said composition in an amount of about 1 to about 20% by weight.

17. The method of claim 16 wherein said starch is present in said composition in an amount of about 5 to about 15% by weight.

18. A method of improving the heat gelation properties of a substantially undenatured vegetable protein isolate containing at least about 90% by weight of vegetable protein (as determined by Kjeldahl nitrogen $\times 6.25$), which comprises:

(a) settling an aqueous dispersion of protein micelles consisting of amphiphilic protein moieties and formed from at least one vegetable protein source material to provide an amorphous protein mass containing said substantially undenatured protein isolate, said isolate having substantially no lipid content, substantially no lysinoalanine content and substantially the same lysine content as the storage protein in the source material, (b) providing said amorphous protein mass in admixture with a starch in an amount, on a dry basis, of up to about 30% by weight of starch, and (c) incorporating in a heat gellable dispersion of said admixture both (i) sufficient food grade salt to provide an ionic strength of said dispersion of at least about 0.3 molar and (ii) sufficient food grade acidifying agent to provide a pH of said dispersion of less than about 5.5.

19. The method of claim 18 wherein said aqueous dispersion of protein micelles from which said isolate is settled is formed by solubilizing the protein in said at least one vegetable protein source material using a food grade salt solution having a concentration of at least 0.2 molar ionic strength and a pH of 5.5 to 6.3 to form a protein solution, and diluting the protein solution to an ionic strength of less than 0.1 molar to cause formation of said dispersion.

20. The method of claim 18 wherein said aqueous dispersion of protein micelles from which said isolate is settled is formed by solubilizing the protein in said at least one vegetable protein source material using a food grade salt solution having a concentration of at least 0.2 molar ionic strength and a pH of about 5 to about 6.8 to form a protein solution, increasing the protein concentration of said protein solution while maintaining the ionic strength thereof substantially constant, and diluting the concentrated protein solution to an ionic strength below about 0.2 molar to cause formation of said dispersion.

21. The method of claim 20 wherein said food grade salt solution has an ionic strength of about 0.2 to about 0.8 molar, a pH of about 5.3 to about 6.2, said protein concentration step is effected by a membrane technique at a volume reduction factor of about 1.1 to about 6.0, as determined by the ratio of volume of protein solution and the volume of concentrated protein solution, and the dilution of the concentrated protein solution is effected by passing the concentrated protein solution into a body of water having a temperature below about 25° C. and a volume sufficient to decrease the ionic strength of the concentrated solution to a value of about 0.06 to about 0.12 molar.

22. The method of claim 21 wherein said protein source material is soybeans, said food grade salt is sodium chloride and said aqueous food grade salt solution contains about 0.001 to about 0.01 M of calcium chloride.

23. The method of claim 19 wherein said dispersion of protein micelles from which said isolate is settled is formed by solubilizing the protein in soybeans at a temperature of about 15° C. to about 75° C. using a food grade salt solution having a concentration of at least 0.2 molar ionic strength and a pH of about 5.6 to about 7.0 to form a protein solution, adjusting the pH of the protein solution to a pH of about 4.8 to about 5.4, and diluting the pH-adjusted solution to an ionic strength value sufficiently low to cause formation of said dispersion.

24. The method of claim 23 wherein said solubilization pH is about 6.0 to about 6.4 and said adjusted pH is about 5.1 to about 5.3.

25. The method of claim 19 wherein said food grade salt and said food grade acidifying agent are incorporated into said admixture by drying said settled solid phase after separation from the remaining aqueous phase, uniformly mixing the starch with the dried isolate, uniformly mixing said food grade salt and said food grade acidifying agent with the resulting admixture of isolate and starch, and forming said dispersion from the resulting uniform mixture.

26. The method of claim 19 wherein said food grade salt and food grade acidifying agent are incorporated into said dispersion by uniformly mixing said starch, said food grade salt and said food grade acidifying agent with said settled solid phase after separation from the remaining aqueous phase, drying the uniform mixture so produced, and forming said dispersion from said dried mixture.

27. The method of claim 19 wherein said food grade salt and said food grade acidifying agent are incorporated into said dispersion by dissolving said food grade salt and said food grade acidifying agent in an aqueous dispersion of said solid admixture.

* * * * *